United States Patent
Park (10) Patent No.: US 7,481,451 B2
(45) Date of Patent: Jan. 27, 2009

(54) SEAT BELT OF VEHICLE WITH AIR BELT

(75) Inventor: Deug Won Park, Inchun (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 484 days.

(21) Appl. No.: 10/990,554

(22) Filed: Nov. 18, 2004

(65) Prior Publication Data

US 2006/0055158 A1 Mar. 16, 2006

(30) Foreign Application Priority Data

Sep. 16, 2004 (KR) ...................... 10-2004-0074180

(51) Int. Cl.
*B60R 21/18* (2006.01)

(52) U.S. Cl. ..................... 280/733; 280/801.2; 280/804

(58) Field of Classification Search ................. 280/733, 280/801.2, 804
See application file for complete search history.

(56) References Cited

U.S. PATENT DOCUMENTS

| | | | | |
|---|---|---|---|---|
| 3,970,329 A | * | 7/1976 | Lewis .......................... | 280/733 |
| 4,306,735 A | * | 12/1981 | Pfeiffer et al. .............. | 280/807 |
| 4,521,034 A | * | 6/1985 | Takada ....................... | 280/733 |
| 5,288,104 A | * | 2/1994 | Chen .......................... | 280/733 |
| 5,303,953 A | * | 4/1994 | Kamiyama et al. .......... | 280/733 |
| 5,445,411 A | * | 8/1995 | Kamiyama et al. .......... | 280/733 |
| 5,984,350 A | * | 11/1999 | Hagan et al. ................ | 280/735 |
| 6,116,637 A | * | 9/2000 | Takeuchi et al. ............ | 280/733 |
| 6,439,601 B1 | * | 8/2002 | Iseki .......................... | 280/733 |
| 6,499,763 B1 | * | 12/2002 | Mishima ..................... | 280/733 |
| 6,572,142 B1 | * | 6/2003 | Iyoshi et al. ................ | 280/737 |
| 6,581,961 B1 | * | 6/2003 | Bowers ...................... | 280/735 |
| 2002/0067031 A1 | * | 6/2002 | Busgen et al. .............. | 280/733 |
| 2002/0125702 A1 | * | 9/2002 | Ohhashi ..................... | 280/733 |
| 2002/0130498 A1 | * | 9/2002 | Kurata et al. ............... | 280/733 |
| 2005/0263990 A1 | * | 12/2005 | Clute .......................... | 280/733 |

OTHER PUBLICATIONS

U.S. Appl. No. 10/990,550 to Park.

* cited by examiner

*Primary Examiner*—John Q. Nguyen
*Assistant Examiner*—George D. Spisich
(74) *Attorney, Agent, or Firm*—Greenblum & Bernstein, P.L.C.

(57) ABSTRACT

A seat belt of a vehicle including an air belt to stably and reliably protect an occupant during a vehicle crash. The seat belt includes a cover made of a fabric material, upper and lower webbings respectively fixed to opposite ends of the cover, a D-ring fixed to the upper webbing and arranged within an occupant compartment of the vehicle, a retractor fixed to the lower webbing to wind and unwind the lower webbing; and an air belt to rapidly supply a high-pressure gas into a bag held in the cover during a vehicle crash, and thus, to inflate the bag. Since the bag is covered by the fabric cover, an improvement in wearing comfort is achieved.

19 Claims, 7 Drawing Sheets

SEAT BELT OF VEHICLE WITH AIR BELT

BACKGROUND OF THE INVENTION

1. Field of the Invention

The present invention relates to a seat belt of a vehicle with an air belt, and, more particularly, to a seat belt of a vehicle which includes an air belt having a cushion covered by a webbing made of a fabric material.

2. Description of the Related Art

In general, seat belts and air bags are installed in the occupant compartment of a vehicle to protect the occupants. Recently, an air belt has been proposed which is mounted, as an air bag device, to a seat belt to more safely protect the driver from an impact generated in the event of a crash.

Figure 1:
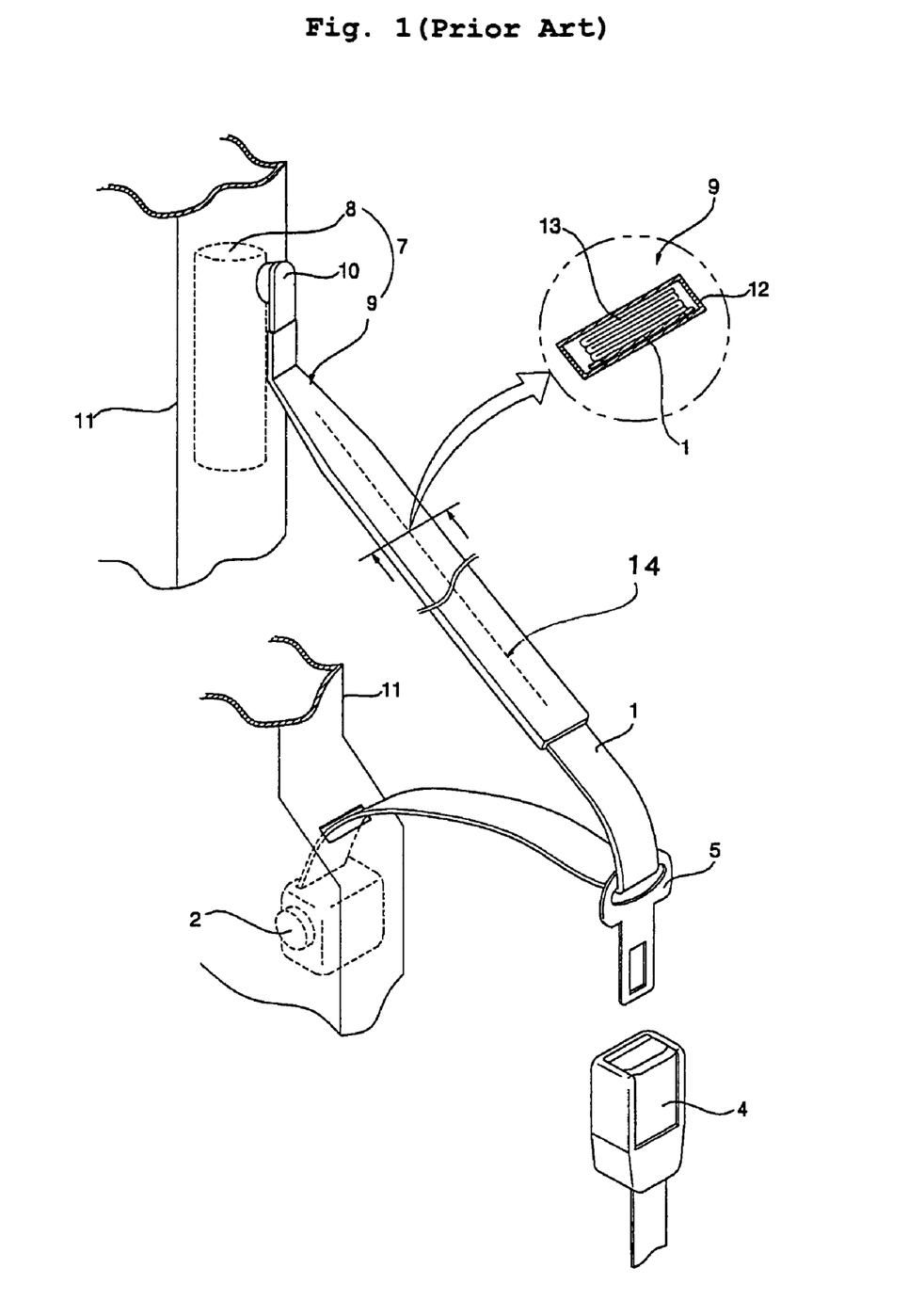
FIG. 1 is a perspective view illustrating a conventional seat belt of a vehicle.

FIG. 1 is a perspective view illustrating a conventional seat belt of a vehicle.

As shown in FIG. 1, the conventional seat belt, which uses a conventional air belt, includes a webbing 1 to traverse the body of the occupant, a retractor 2 to wind the webbing 1 in a tensed state and to prevent the webbing 1 from being abruptly unwound during a vehicle crash, a buckle 4 fixedly mounted to a seat 6, and a tongue 5 arranged at an intermediate portion of the webbing 1 and adapted to be coupled with the buckle 4. A webbing 1 extends through the tongue 5. When the tongue 5 is coupled to the buckle 4, the webbing 1 traverses both the shoulder and knees of the occupant. The conventional seat belt also includes an air belt 7 mounted to the webbing 1 to inflate during a vehicle crash.

The air belt 7 includes an inflator 8 to be operated by an electronic control unit installed in the vehicle during a vehicle crash to inject a high-pressure gas, a cushion 9 to be inflated by the gas injected from the inflator 8, and a connector 10 to connect the inflator 8 and the cushion 9.

The inflator 8 is arranged in the interior of a center filler 11 included in the vehicle. The connector 10 is protruded into the occupant compartment of the vehicle. The cushion 9 is connected to the connector 10, and is fixed in a longitudinal direction of the webbing 1.

The cushion 9 is fixedly mounted to an outer surface of the webbing 1. The cushion 9 is torn when a high-pressure gas is supplied from the inflator 8, and thus, is forwardly inflated. The cushion 9 includes a cover 12 having one end fixed to the connector 10 and the other end fixed to the webbing 1, and a bag 13 arranged in the cover 12 in a folded state, and connected to the connector 10 so that the high-pressure gas from the inflator 8 is supplied into the bag 13 via the connector 10.

The cover 12 is fixed to the webbing 1, and is formed with a tear line 14 so that the cover 12 is cut when the bag 13 inflates rapidly. In order to store the bag 13, the cover 12 is made of a hard plastic material.

Meanwhile, the retractor 2, to which the end of the webbing 1 opposite to the air belt 7 is fixed, is arranged at a lower portion of the center filler 11. The webbing 1 extends through a hole provided at the center filler 11 so that the webbing 1 is fixed to the retractor 2.

In the seat belt, which includes the above-mentioned conventional air belt, however, high impact is applied, during a vehicle crash, to a portion of the connector 10, to which the cover 12 is connected, because the cushion 9 and inflator 8 are connected by the connector 10. As a result, the cover 12 may be separated from the connector 10.

For this reason, the seat belt including the conventional air belt 7 has a problem in that the portion of the connector 10 may be damaged by the impact generated during a vehicle crash prior to an operation of the air belt 7 to protect the occupant, so that the air belt 7 may not operate.

Furthermore, the seat belt including the conventional air belt has a problem in that the connector may injure the occupant during a vehicle crash because the connector is protruded into the occupant compartment.

Moreover, the seat belt including the conventional air belt has a problem in that the cover 12 is made of a plastic material, which is uncomfortable to the occupant, in spite of the fact that the occupant contacts the cover 12, so that a degradation in wearing comfort occurs.

SUMMARY OF THE INVENTION

The present invention has been made in view of the above-mentioned problems incurred with the related art, and it is an object of the invention to provide a seat belt of a vehicle which includes an air belt configured to exhibit a reduced possibility of damage even when high impact is applied to the air belt during a vehicle crash, thereby being capable of achieving a reliable operation and an improvement in wearing comfort.

In accordance with the present invention, this object is accomplished by providing a seat belt of a vehicle comprising: a cover made of a fabric material; upper and lower webbings respectively fixed to opposite ends of the cover; a D-ring fixed to the upper webbing and arranged within an occupant compartment of the vehicle; a retractor fixed to the lower webbing to wind and unwind the lower webbing; and an air belt to rapidly supply a high-pressure gas into a bag held in the cover during a vehicle crash, and thus, to inflate the bag.

The seat belt may further comprise a level adjuster to adjust a vertical level of the D-ring in accordance with the build of the occupant. In accordance with the present invention, the connection of the bag to an inflator is maintained in the event of a vehicle crash.

The inflator may comprise a dual inflator. Accordingly, it is possible to inject an appropriate amount of gas in accordance with the level of an impact generated during a vehicle crash.

Since the bag is covered by the fabric cover, an improvement in wearing comfort is achieved.

The D-ring is mounted in a state of being in contact with a center filler included in the vehicle. Accordingly, it is possible to restrain the D-ring from coming into contact with the occupant during a vehicle crash, thereby minimizing occupant injury.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Hereinafter, exemplary embodiments of a seat belt of a vehicle including an air belt according to the present invention will be described with reference to the annexed drawings.

Although a number of embodiments may be implemented for the seat belt including the air belt according to the present invention, the following description will be given in conjunction with the most preferable embodiment. Also, since the basic structure of the seat belt including the air belt is identical to that of the above-mentioned related art, no description will be given of the basic structure.

Figure 2:
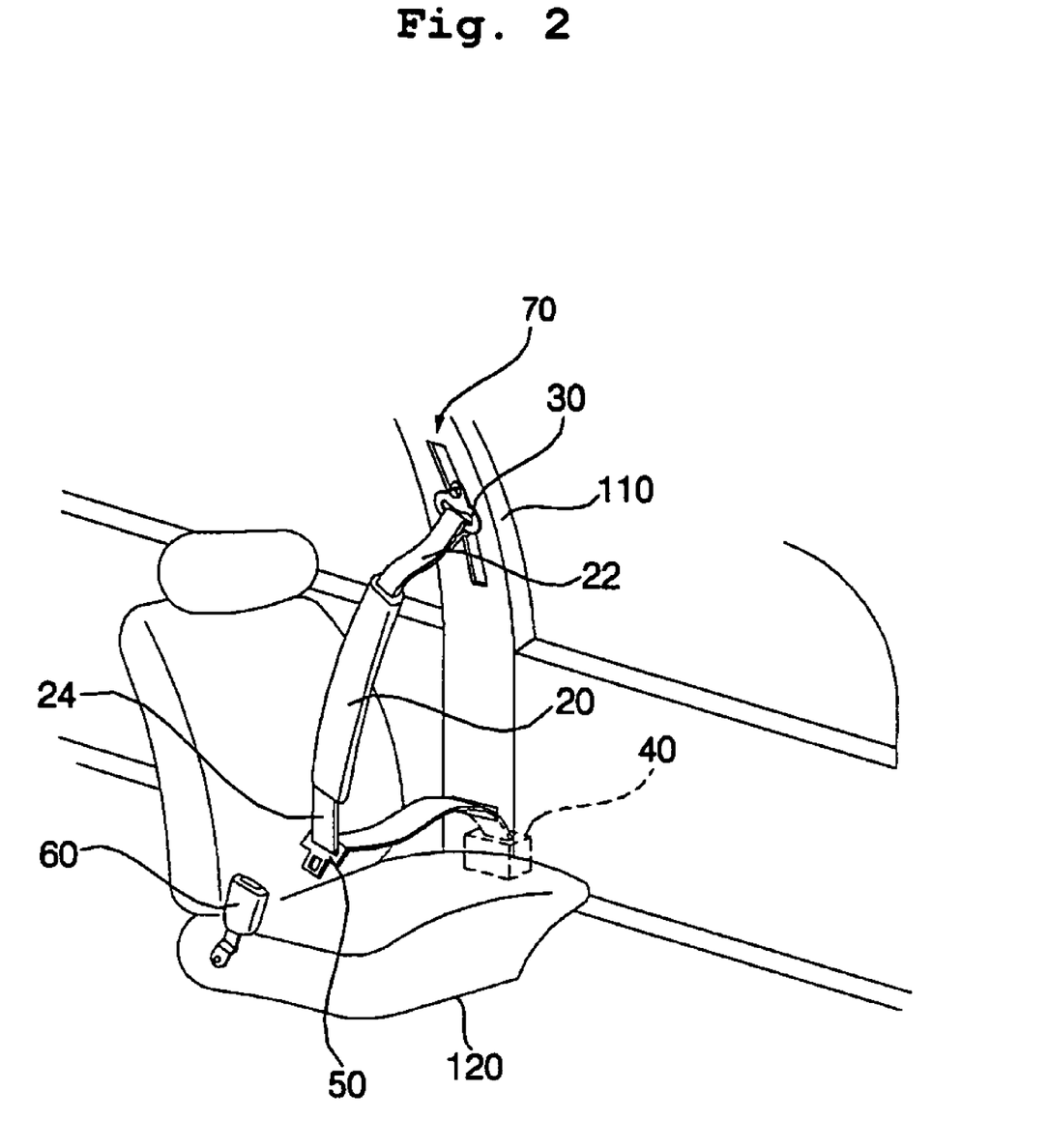
FIG. 2 is a perspective view illustrating an occupant compartment of a vehicle, in which a seat belt including an air belt according to the present invention is installed.
Figure 3:
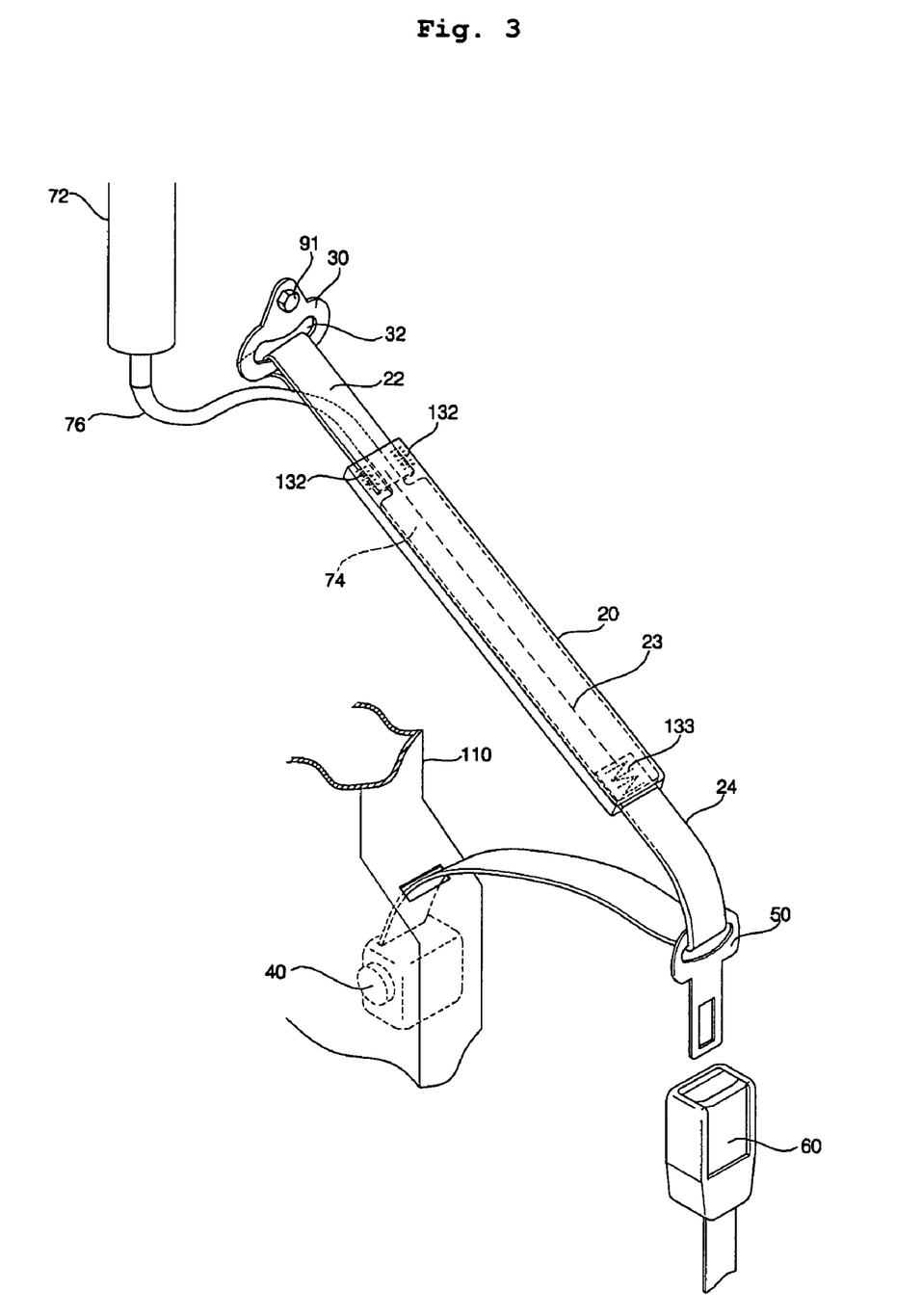
FIG. 3 is a perspective view illustrating the seat belt including the air belt according to the present invention.

FIG. 2 is a perspective view illustrating an occupant compartment of a vehicle, in which a seat belt including an air belt according to the present invention is installed. FIG. 3 is a perspective view illustrating the seat belt including the air belt according to the present invention.

As shown in FIGS. 2 and 3, the seat belt, which includes the air belt according to the present invention, is a device to restrain the occupant seated on a seat 120, and thus, to prevent the occupant from being forwardly projected during a vehicle crash.

To this end, the seat belt includes a cover 20, upper and lower webbings 22 and 24 respectively fixed to opposite ends of the cover 20, a D-ring 30 fixed to the upper webbing 22, a retractor 40 fixed to the lower webbing 24, a tongue 50, through which the lower webbing 24 extends such that the tongue 50 is movable along the lower webbing 24, and a buckle 60 fixedly mounted to one side of the seat 120, and adapted to be coupled with the tongue 50. The seat belt also includes an air belt 70 to inflate forwardly while tearing the cover 20 during a vehicle crash, and a level adjuster to adjust the level of the D-ring 30.

The D-ring 30 has a slot, through which the upper webbing 22 extends to be fixed to the D-ring 30, and a hole (not shown) to mount the D-ring 30 to the level adjuster.

The upper webbing 22 has one end, that is, an upper end, extending through the slot 32. The upper end of the upper webbing 22 is folded, and then fixed to a portion of the upper webbing 22 overlapping therewith by means of stitches 134.

One end, that is, a lower end, of the lower webbing 24 is fixed to the retractor 40. The retractor serves to wind/unwind the lower webbing 24 and to prevent the lower webbing 24 from being abruptly protracted during a vehicle crash. Such a function may be provided by a general retractor structure. In accordance with the present invention, however, the retractor 40 is arranged within the center filler 110 at a lower portion of the center filler 110. The lower webbing 24 extends from the retractor 40 into the occupant compartment of the vehicle.

The buckle 60 is fixedly mounted to the seat 120 at a position opposite to the retractor 40 with reference to the seat 120. When the tongue 50 is coupled with the buckle 60, the lower webbing 24 traverses the knees of the occupant, and the upper webbing 22 and cover 20 traverse the breast of the occupant.

The air belt 70 includes an inflator 72 to generate a high-pressure gas in response to a signal received from an electronic control unit (not shown) installed in the vehicle, a bag 74 to receive the high-pressure gas from the inflator 72, and thus, to be rapidly inflated from a folded state, and a tube 76 to guide the high-pressure gas generated from the inflator 72 to the bag 74.

The inflator 72 receives a crash signal generated from the electronic control unit upon sensing a crash of the vehicle, and generates a high-pressure gas in response to the crash signal. The generated high-pressure gas is supplied to the bag 74 via the tube 76, so that the bag 74 is rapidly inflated by the high-pressure gas, thereby buffering impact applied to the occupant.

In particular, the inflator 72 may be a dual inflator. In this case, the inflator 72 injects an amount of gas determined between different amounts in accordance with an impact level measured by an impact sensor during a vehicle crash. For example, the dual inflator contains a gas generating agent in two compartments, which are adapted to inject 70% and 30% of the total gas amount, respectively. When the impact level measured by the impact sensor is less than a predetermined level, the dual inflator injects only 70% of the total gas amount. On the other hand, when the impact level measured by the impact sensor is not less than a predetermined level, the dual inflator injects 100% of the total gas amount. Where the inflator 72 injects an amount of gas determined between different amounts during a vehicle crash, it is possible to minimize the impact applied to the occupant by the bag 74 inflating during the inflating process.

As described above, the inflator 72 is arranged within the center filler 110 of the vehicle. The inflator 72 is also made of a flexible material, so that it is flexible when the D-ring 30 or upper webbing 22 moves. Accordingly, the connection between the inflator 72 and the bag 74 can be maintained even when the D-ring 30 or upper webbing 22 moves.

In particular, the tube 76 is arranged on one of the opposite main surfaces of the upper webbing 22, which faces the center filler 110, so that the tube 76 is exposed to the occupant.

Figure 4A:
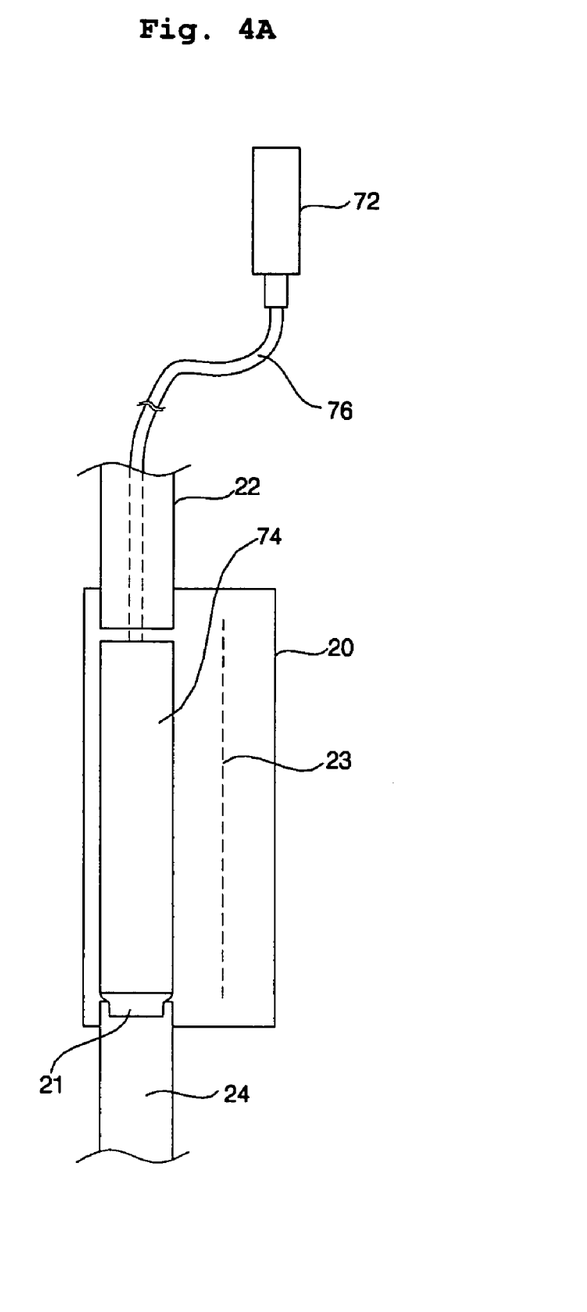
FIG. 4A is a developed view of a cover and upper and lower webbings according to the present invention.
Figure 4B:
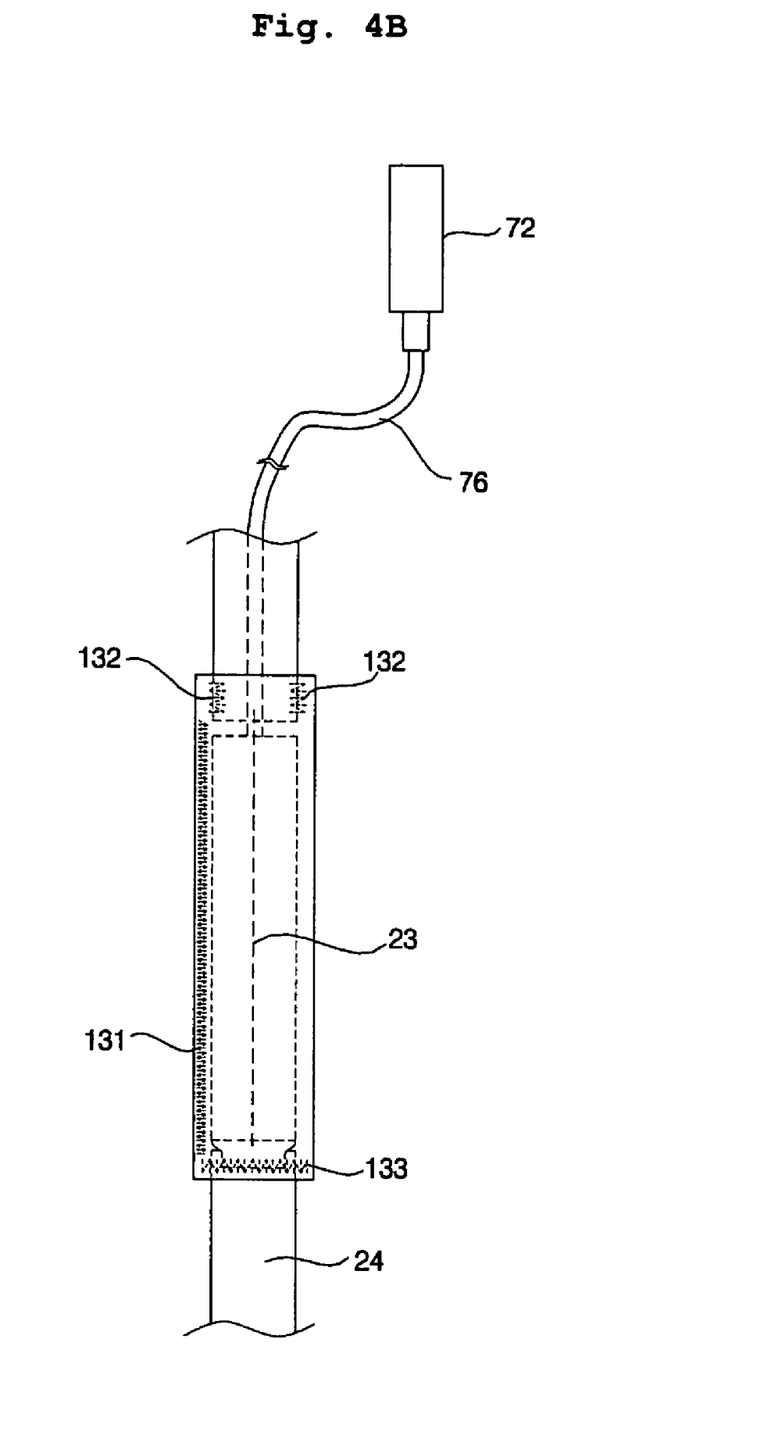
FIG. 4B is a plan view illustrating stitches formed at the cover and the upper and lower webbings according to the present invention.

FIG. 4A is a developed view of the cover and upper and lower webbings according to the present invention. FIG. 4B is a plan view illustrating stitches formed at the cover and the upper and lower webbings according to the present invention.

As shown in FIG. 3 and FIGS. 4A and 4B, the upper and lower webbings 22 and 24 are fixed to the cover 20 by the stitches.

The bag 74 is held in the cover 20 in a state of being connected with the tube 76. The upper and lower webbings 22 and 24 are positioned above and beneath the bag 74, respectively.

The stitches may be formed in various orders. Preferably, the upper and lower webbings 22 and 24 and the cover 20 are simultaneously stitched.

The bag 74 is held in the cover in a state of being folded several times. The cover 20 may have one end 21 fixed to the cover 20 or lower webbing 24 by means of stitches, so as to prevent the cover 20 from being moved during the inflating process. Of course, the end 21 of the cover 20 cannot receive the gas supplied from the inflator 72, so that the end 21 is used to fix the cover 20.

Preferably, the cover 20 is made of a material not causing the occupant to be uncomfortable while having a flexibility. The cover 20 may be made of a fabric, as in the upper and lower webbings 22 and 24. Accordingly, the cover 20 can be well flexible when the occupant wears the seat belt.

The cover 20 is provided with a tear line 23. When the bag 74 inflates, the cover 20 is torn along the tear line 23 by the inflating bag 74. After tearing the bag 20 along the tear line 23, the bag 74 is forwardly and rapidly inflated.

Hereinafter, the process for fixing the cover 20 and the upper and lower webbings 22 and 24 will be described.

First, the upper and lower webbings 22 and 24 and the bag 74 are seated on an inner surface of the cover 20. Thereafter, the cover 20 is folded to cover the upper and lower webbings 22 and 24 and the bag 74. In this state, the lateral ends of the cover 20 are stitched, thus forming stitches 131. Also, the upper and lower webbings 24 arranged at the upper and lower ends of the cover 20 are fixed to the cover 20 by means of stitches 132 and 133, respectively.

At this time, the stitching process must be carefully carried out so as to prevent the tube 76 arranged between the upper webbing 22 and the cover from being stitched.

The stitches 131 formed at one side of the cover 20 may be used as the tear line 23.

Figure 5:
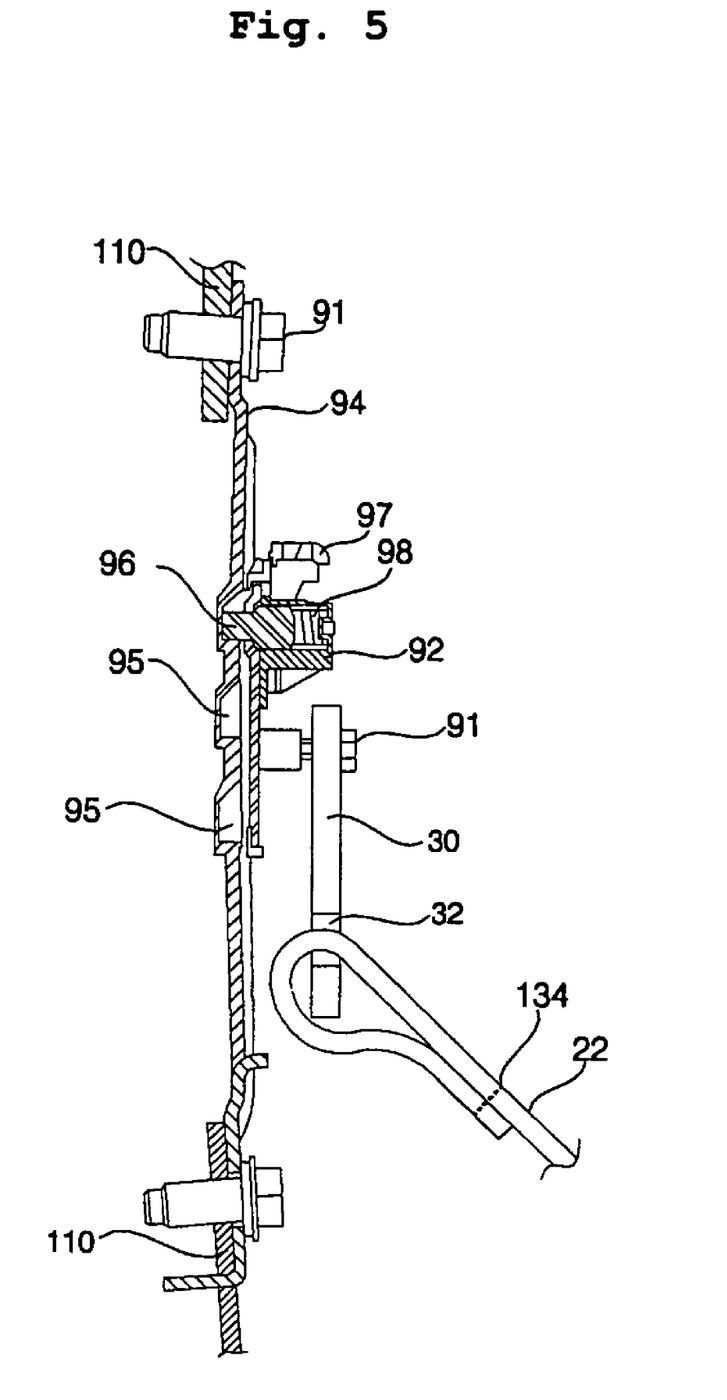
FIG. 5 is a sectional view illustrating a first embodiment of the level adjuster according to the present invention.

FIG. 5 is a sectional view illustrating a first embodiment of the level adjuster according to the present invention.

As shown in FIG. 5, the level adjuster is mounted to the center filler 110 while carrying the D-ring 30 to enable the occupant to adjust the vertical level of the D-ring 30.

The level adjuster includes a fixed member 94 fixedly mounted to the center filler 110, a movable member 92 to carry the D-ring 30, a locking member 96 mounted in the movable member 92 in a state of protruding from the movable member 92, and a spring 98 interposed between the movable member 92 and the locking member 96 to apply an elastic force to the locking member 96.

The D-ring 30 is mounted to the movable member 92 by means of a bolt 91. When a vehicle crash occurs, the D-ring 30 is pivoted about the bolt 91, thereby reducing the impact caused by the crash.

The fixed member 94 has a plurality of grooves 95 recessed toward the center filler 10 while being vertically spaced apart from one another. The end of the locking member 96 protruded toward the fixed member 94 from the movable member 92 is engaged with a selected one of the grooves 95, so that the D-ring 30 is locked at a level corresponding to the selected groove 95.

A knob 97 is attached to the locking member 96. The occupant can disengage the locking member 96 from the selected groove 95 by pulling the knob 97, and then can move the locking member 96 along the fixed member 94 to engage a desired one of the grooves 95.

The locking member 96 is received in a hole (not shown) formed in the movable member 92 while being supported by the spring 98. Accordingly, the locking member 96 is maintained in a state of engagement with the selected groove 95 unless a disengagement force from the knob 97 is applied to the locking member 96.

When the occupant pulls the knob 97 to adjust the level of the D-ring 30, the locking member 96 is retracted from the selected groove 95. In this state, the occupant can adjust the level of the D-ring 30 by vertically moving the movable member 92.

Figure 6:
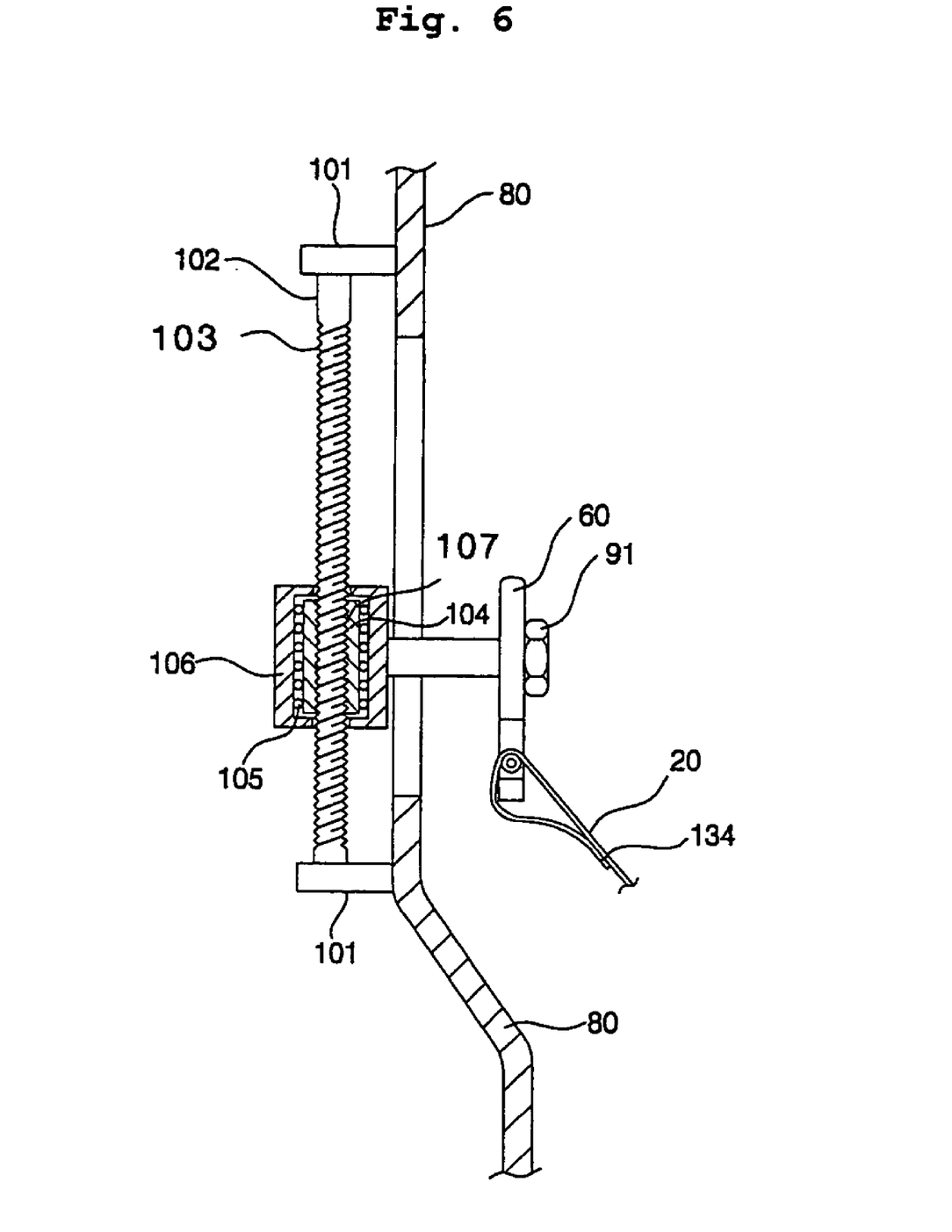
FIG. 6 is a sectional view illustrating a second embodiment of the level adjuster according to the present invention.

FIG. 6 is a sectional view illustrating a second embodiment of the level adjuster according to the present invention.

As shown in FIG. 6, the level adjuster according to the second embodiment of the present invention is adapted to lock the D-ring 30, using frictional force. This level adjuster includes a shaft 102 fixed to the center filler 110, an inner housing movable along the shaft 102, an outer housing 106 fitted around the inner housing 104 to apply an external force to move the inner housing 104 along the shaft 102, and a bearing 105 arranged between the inner housing 104 and the outer housing 105 to minimize generation of friction.

The shaft 102 has opposite ends fixed to the inner surface of the center filler 110 by means of brackets 101, respectively. Threads 103 are formed on a peripheral surface of the shaft 102.

The inner housing 104 is provided, at an inner peripheral surface thereof, with threads 107 threadedly coupled with the threads 103 of the shaft 102. The D-ring 30 is pivotally mounted to the outer housing 106 by means of the bolt 91. The D-ring 30 is pivoted by a force applied thereto from the upper webbing 22.

Hereinafter, the operation of the level adjuster according to the second embodiment of the present invention will be described.

When the occupant vertically moves the D-ring 60 while grasping the D-ring 60 to adjust the vertical level of the D-ring 30, the force is transmitted to the inner housing 104 via the outer housing 106, and is then transmitted to the threads 107 of the inner housing 104. By the force transmitted to the threads 107, a partial force is generated which acts in a direction inclined from an axial direction of the shaft 102 by the inclination of the threads 107. As a result, the inner housing 104 is rotated. In accordance with the rotation of the inner housing 104, the outer housing 106 is slowly moved in the axial direction of the shaft 102. When the occupant releases the force applied to the D-ring 60, and thus, the outer housing 106, the inner housing 102 is maintained in a stopped state by virtue of the frictional force.

The function and effect of the seat belt having the above-described configuration according to the present invention will now be described.

When a vehicle crash occurs, the impact sensor (not shown) installed in the vehicle senses an impact caused by the vehicle crash, and sends a sensing signal indicative of the sensed impact level to the electronic control unit. In response to the sensed impact level, the electronic control unit controls the inflator 72 to inject an appropriate amount of gas. The bag 74 receives the gas via the tube 76, so that the bag 74 is rapidly inflated from the folded state. During the inflating process, the bag 74 is forwardly inflated while tearing the cover 20 along the tear line 23.

As apparent from the above description, the vehicle seat belt including the air belt according to the present invention has an effect of an improvement in wearing comfort because the bag 74 is covered by the cover 20, which is made of a fabric material, and the fabric cover 20 comes into contact with the occupant.

Since the cover 20 is made of a fabric material, it is possible to connect the upper and lower webbings 22 and 24 to the cover 20. Accordingly, there is an advantage in the assembly process.

The upper webbing 22 is also fixed to the D-ring 30 by means of stitches. Accordingly, it is possible to reduce the possibility that the upper webbing 22 is cut or damaged.

Since the D-ring 30 is mounted to the level adjuster, it is possible to adjust the vertical level of the D-ring 30 in accordance with a selection of the user.

The air belt uses a dual inflator capable of adjusting the amount of injected gas. Accordingly, it is possible to more stably and reliably protect the occupant.

Also, the portion of the D-ring 30 protruded into the occupant compartment of the vehicle is reduced. Accordingly, it is possible to minimize occupant injury caused by the impact generated during a vehicle crash.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in priority Korean Application No. 2004-74180, filed on Sep. 16, 2004, which is herein expressly incorporated by reference in its entirety.

What is claimed is:

1. A seat belt of a vehicle comprising:
a cover made of a fabric material;
upper and lower webbings respectively fixed to opposite ends of the cover;
a D-ring fixed to the upper webbing and arranged within an occupant compartment of the vehicle;
a retractor fixed to the lower webbing to wind and unwind the lower webbing;
an air belt to rapidly supply a high-pressure gas into a bag held in the cover during a vehicle crash, and thus, to inflate the bag;
a dual inflator having two gas generating components which are configured to inject different amounts of gas, respectively; and
a level adjuster arranged in the occupant compartment to adjust a vertical level of the D-ring, the D-ring being mounted to the level adjuster such that the vertical level of the D-ring is adjustable in accordance with an operation of an occupant,
wherein only the gas generating component configured to inject a greater amount than that of the other gas generating component injects gas when an impact level is less than a predetermined level, and
wherein the level adjuster includes a fixed member fixedly mounted to a center filler, a movable member to carry the D-ring, a retractable locking member mounted in the movable member to protrude from the movable member, and a spring interposed between the movable member and the locking member to apply an elastic force to the locking member.

2. The seat belt according to claim 1, wherein the upper and lower webbings are fixed to the cover by stitches.

3. The seat belt according to claim 1, wherein the upper webbing has one end extended through the D-ring, folded, and then fixed to a portion of the upper webbing by stitches, so that the upper webbing and the D-ring are fixed to each other.

4. The seat belt according to claim 1, wherein the retractor is arranged within a center filler included in the vehicle.

5. The seat belt according to claim 1, wherein the cover includes a tear line to be torn when the bag inflates.

6. The seat belt according to claim 1, wherein the D-ring is pivotally mounted to the level adjuster.

7. The seat belt according to claim 1, wherein the air belt comprises:
the bag to receive the high-pressure gas from the inflator, and thus, to be rapidly inflated; and
a tube to connect the inflator and the bag.

8. The seat belt according to claim 7, wherein the inflator is arranged within a center filler included in the vehicle.

9. The seat belt according to claim 7, wherein the tube is made of a soft material having a high flexibility.

10. The seat belt according to claim 9, wherein:
the upper webbing is fixed to the cover by stitches; and
the tube is inserted between the upper webbing and the cover, and is connected to the bag.

11. The seat belt according to claim 10, wherein the tube is arranged on a main surface of the upper webbing facing a center filler included in the vehicle such that the tube is hidden from the view of an occupant.

12. The seat belt according to claim 11, wherein the inflator is arranged within the center filler, and is connected to the tube arranged on the main surface of the upper webbing facing the center filler.

13. The seat belt according to claim 7, wherein the dual inflator injects an amount of gas determined between different amounts in accordance with an impact generated during a vehicle crash.

14. The seat belt according to claim 7, wherein:
the dual inflator is arranged within a center filler included in the vehicle at an upper portion of the center filler; and
the retractor is arranged within the center filler at a lower portion of the center filler.

15. The seat belt according to claim 7, wherein the upper and lower webbings are fixed to the cover by stitches.

16. The seat belt according to claim 7, wherein the upper webbing has one end extended through the D-ring, folded, and then fixed to a portion of the upper webbing by stitches, so that the upper webbing and the D-ring are fixed to each other.

17. The seat belt according to claim 7, wherein the cover includes a tear line to be torn when the bag inflates.

18. The seat belt according to claim 17, wherein the tear line faces the front side of the vehicle.

19. A seat belt of a vehicle comprising:
a cover made of a fabric material;
upper and lower webbings respectively fixed to opposite ends of the cover;
a D-ring fixed to the upper webbing and arranged within an occupant compartment of the vehicle;
a retractor fixed to the lower webbing to wind and unwind the lower webbing;
an air belt to rapidly supply a high-pressure gas into a bag held in the cover during a vehicle crash, and thus, to inflate the bag;
a dual inflator having two gas generating components which are configured to inject different amounts of gas, respectively; and
a level adjuster arranged in the occupant compartment to adjust a vertical level of the D-ring, the D-ring being mounted to the level adjuster such that the vertical level of the D-ring is adjustable in accordance with an operation of an occupant,
wherein only the gas generating component configured to inject a greater amount than that of the other gas generating component injects gas when an impact level is less than a predetermined level, and
wherein the level adjuster is configured to lock the D-ring using frictional force, and
wherein the level adjuster includes a shaft fixed to a center filler, an inner housing movable along the shaft, an outer housing fitted around the inner housing to apply an external force to move the inner housing along the shaft, and a bearing arranged between the inner housing and the outer housing to minimize generation of friction.

* * * * *